United States Patent
Misawa

(10) Patent No.: US 8,107,805 B2
(45) Date of Patent: Jan. 31, 2012

(54) PHOTOGRAPHING CONTROL DEVICE AND METHOD, AS WELL AS PROGRAM

(75) Inventor: Takeshi Misawa, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/827,997

(22) Filed: Jun. 30, 2010

(65) Prior Publication Data

US 2011/0002678 A1    Jan. 6, 2011

(30) Foreign Application Priority Data

Jul. 3, 2009  (JP) ................................ 2009-158380

(51) Int. Cl.
*G03B 7/00* (2006.01)

(52) U.S. Cl. ......................................................... 396/63

(58) Field of Classification Search ................. 396/63
See application file for complete search history.

(56) References Cited

U.S. PATENT DOCUMENTS

| 7,889,985 | B2 * | 2/2011 | Misawa et al. ............... 396/122 |
| 2004/0207743 | A1 * | 10/2004 | Nozaki et al. ............ 348/333.12 |
| 2009/0040315 | A1 * | 2/2009 | Nakase et al. ............ 348/207.99 |
| 2009/0115864 | A1 * | 5/2009 | Ogawa ....................... 348/222.1 |
| 2009/0179998 | A1 * | 7/2009 | Steinberg et al. .......... 348/222.1 |
| 2009/0195666 | A1 * | 8/2009 | Chen et al. ................. 348/218.1 |

FOREIGN PATENT DOCUMENTS

| JP | 11-38313 | 2/1999 |
| JP | 2001-215404 | 8/2001 |
| JP | 2009-21862 | 1/2009 |

* cited by examiner

*Primary Examiner* — Rodney Fuller

(74) *Attorney, Agent, or Firm* — McGinn IP Law Group, PLLC

(57) ABSTRACT

An image is obtained using a photographing unit including an optical system provided with an aperture and focus adjusting mechanism. Two or more types of subjects are detected from the image. When the two or more types of subjects are detected from the image, one priority subject is determined among the two or more types of subjects. The aperture and the optical system are adjusted so that the priority subject is focused and the subject other than the priority subject is within a depth of field of the photographing unit.

20 Claims, 9 Drawing Sheets

| | |
|---|---|
| 41 — | ☐ PERSON PRIORITY | — 40
| 41A — | ☐ CENTER PRIORITY |
| 41B — | ☐ LARGER SIZE PRIORITY |
| 41C — | ☐ CHILD PRIORITY |
| 41D — | ☐ REGISTERED FACE PRIORITY |
| 42 — | ☒ PET PRIORITY |
| 42A — | ☒ CENTER PRIORITY |
| 42B — | ☐ DOG PRIORITY |
| 42C — | ☐ REGISTERED FACE PRIORITY |

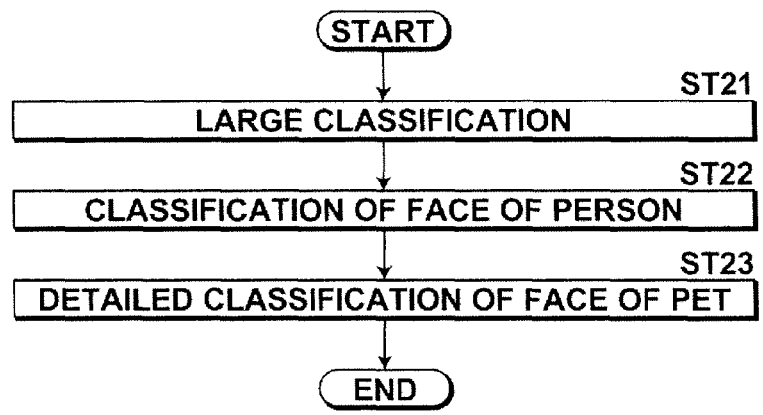
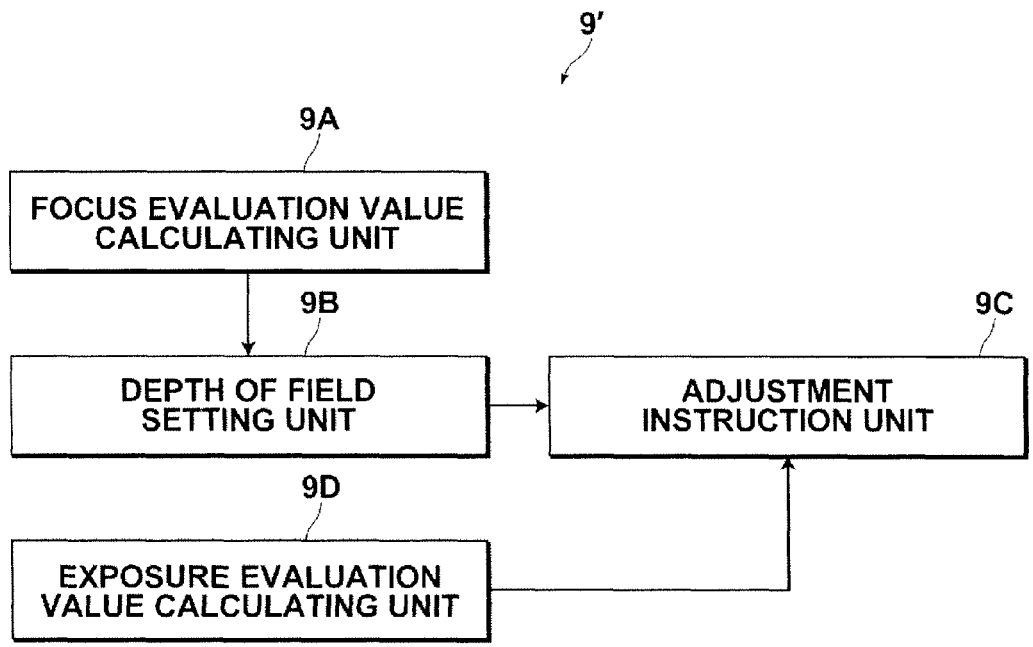

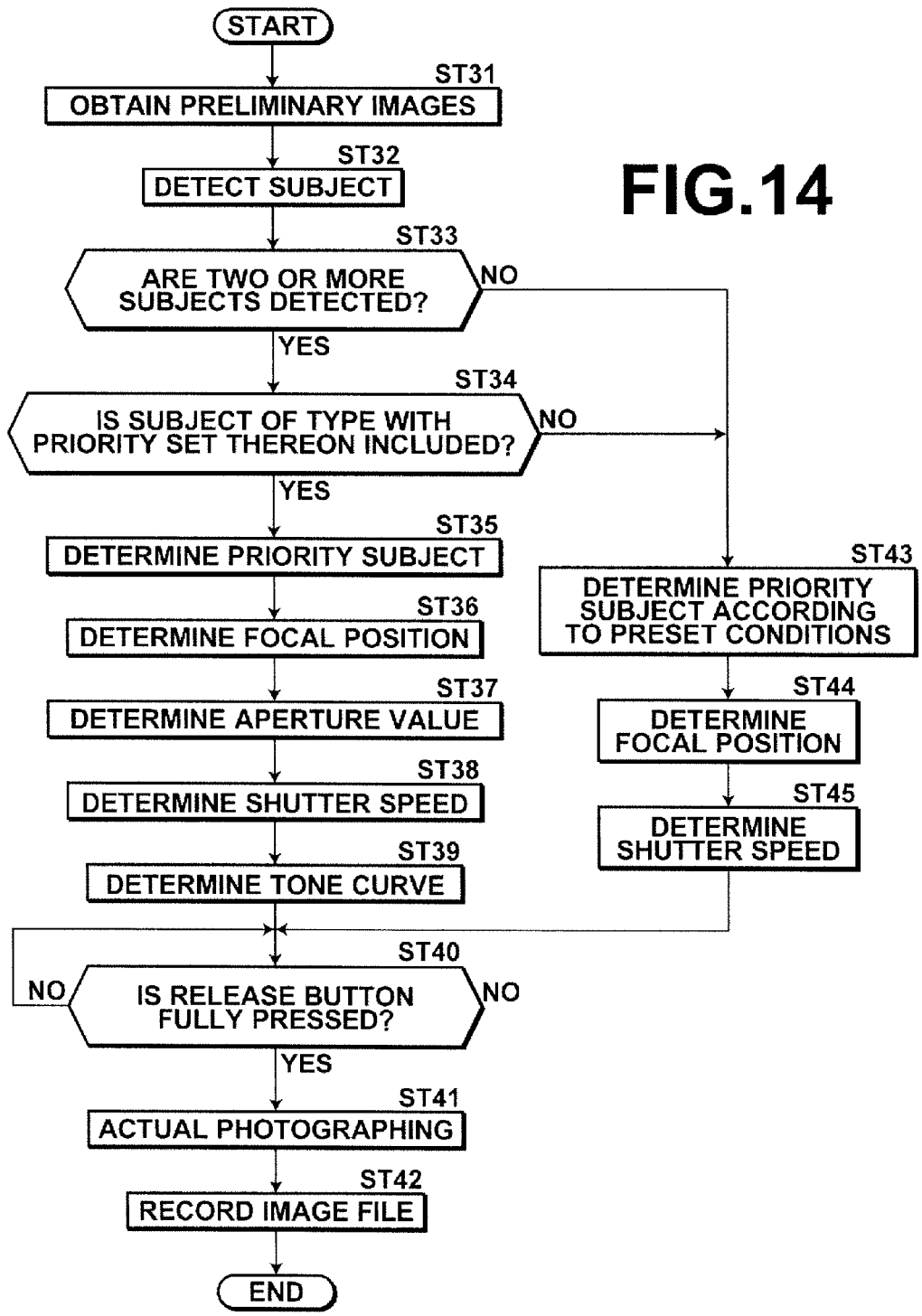

PHOTOGRAPHING CONTROL DEVICE AND METHOD, AS WELL AS PROGRAM

BACKGROUND OF THE INVENTION

1. Field of the Invention

The present invention relates to a photographing control device and a photographing control method for use in a case where two or more types of subjects are photographed, as well as a program for causing a computer to carry out the photographing control method.

2. Description of the Related Art

Photographing apparatuses having functions to detect a face of a person from a photographed image and change conditions of image processing applied to the image or photographing conditions depending on the result of face detection have been proposed. In such photographing apparatuses, the face detection is achieved by detecting face candidate areas from the image, and carrying out matching between the face candidate areas and face patterns stored in a database. Further, a technique has been proposed, in which not only the face patterns but also patterns of various pets, such as dog, cat and bird, are stored in a database, and a pet specified by specifying the type of pet is detected (see Japanese Unexamined Patent Publication No. 2009-021862, which is hereinafter referred to as Patent Document 1).

When photographing is carried out, there are cases where not only one person but two or more persons are photographed. When two or more persons are at different distances from the photographing apparatus in the direction of optical axis and one of the persons is focused, image of the other person(s) is blurred. Therefore, a technique has been proposed, which involves dividing the image into two or more subject areas, detecting a main subject area from the subject areas, and controlling the focal position and the aperture of the optical system of the photographing apparatus so that all the detected main subject areas are focused (see Japanese Unexamined Patent Publication No. 11(1999)-038313, which is hereinafter referred to as Patent Document 2). Another technique has been proposed, which involves determining during photographing whether or not it is photographing of a person, and if the photographing of a person is carried out, setting a shallow depth of field with focusing the person to obtain an image like a portrait with a blurred background (see Japanese Unexamined Patent Publication No. 2001-215404, which is hereinafter referred to as Patent Document 3).

None of the above-mentioned Patent Documents, however, considers a case where two or more types of subjects, such as a person and a pet, are photographed, and it is difficult to appropriately photograph desired types of subjects.

SUMMARY OF THE INVENTION

In view of the above-described circumstances, the present invention is directed to enable appropriately photographing desired types of subjects when two or more types of subjects, such as a person and a pet, are photographed.

An aspect of a photographing control device according to the invention includes:

photographing means for obtaining an image through a photographing operation, the photographing means including an optical system provided with an aperture and focus adjusting mechanism;

subject detecting means for detecting two or more types of subjects from the image;

priority subject determining means for determining, when the two or more types of subjects are detected from the image, one priority subject among the two or more types of subjects; and adjusting means for adjusting the aperture and the optical system so that the priority subject is focused and the subject other than the priority subject is within a depth of field of the photographing means.

The "photographing means" herein obtains an image through a photographing operation and includes a shutter and an image pickup device, besides the optical system provided with the aperture and focus adjusting mechanism.

To adjusted the depth of field, a shallower depth of field is achieved by widening the aperture (reducing the F value), and a deeper depth of field is achieved by narrowing the aperture (increasing the F value).

The photographing control device according to the invention may further include dynamic range adjusting means for adjusting a dynamic range of the image so that the priority subject has a predetermined lightness and the subject other than the priority subject is within the dynamic range of the image.

In the photographing control device according to the invention, the subject detecting means may detect a human face and at least one type of animal face as different types of subjects.

A photographing apparatus according to the invention includes the photographing control device of the invention.

An aspect of a photographing control method according to the invention includes the steps of:

obtaining an image using photographing means including an optical system provided with an aperture and focus adjusting mechanism;

detecting two or more types of subjects from the image;

determining, when the two or more types of subjects are detected from the image, one priority subject among the two or more types of subjects; and adjusting the aperture and the optical system so that the priority subject is focused and the subject other than the priority subject is within a depth of field of the photographing means.

The photographing control method according to the invention may further include the step of adjusting a dynamic range of the image so that the priority subject has a predetermined lightness and the subject other than the priority subject is within the dynamic range of the image.

In the photographing control method according to the invention, the step of detecting may include detecting a human face and at least one type of animal face as different types of subjects.

The photographing control method according to the invention may also be implemented as a program for causing a computer to carry out the photographing control method.

According to the present invention, when two or more types of subjects are detected from an image, one priority subject is determined among the two or more types of subjects, and the aperture and the optical system of the photographing means is adjusted so that the priority subject is focused and the subject other than the priority subject is within the depth of field. In this manner, when two or more types of subjects are photographed, an image in which the priority subject is best focused and the other subjects are generally focused can be obtained.

Further, by adjusting the dynamic range of the image so that the priority subject has a predetermined lightness and the subject other than the priority subject is within the dynamic range of the image, an image in which the priority subject has a predetermined lightness and no white saturation and black saturation occurring in the other subject can be obtained.

BRIEF DESCRIPTION OF THE DRAWINGS

FIG. 11 is a flow chart illustrating a subject detection process, FIG. 12 is a schematic block diagram illustrating the configuration of a controlling unit in the second embodiment, FIG. 14 is a flow chart illustrating a process carried out in the second embodiment.

DESCRIPTION OF THE PREFERRED EMBODIMENTS

Figure 1:
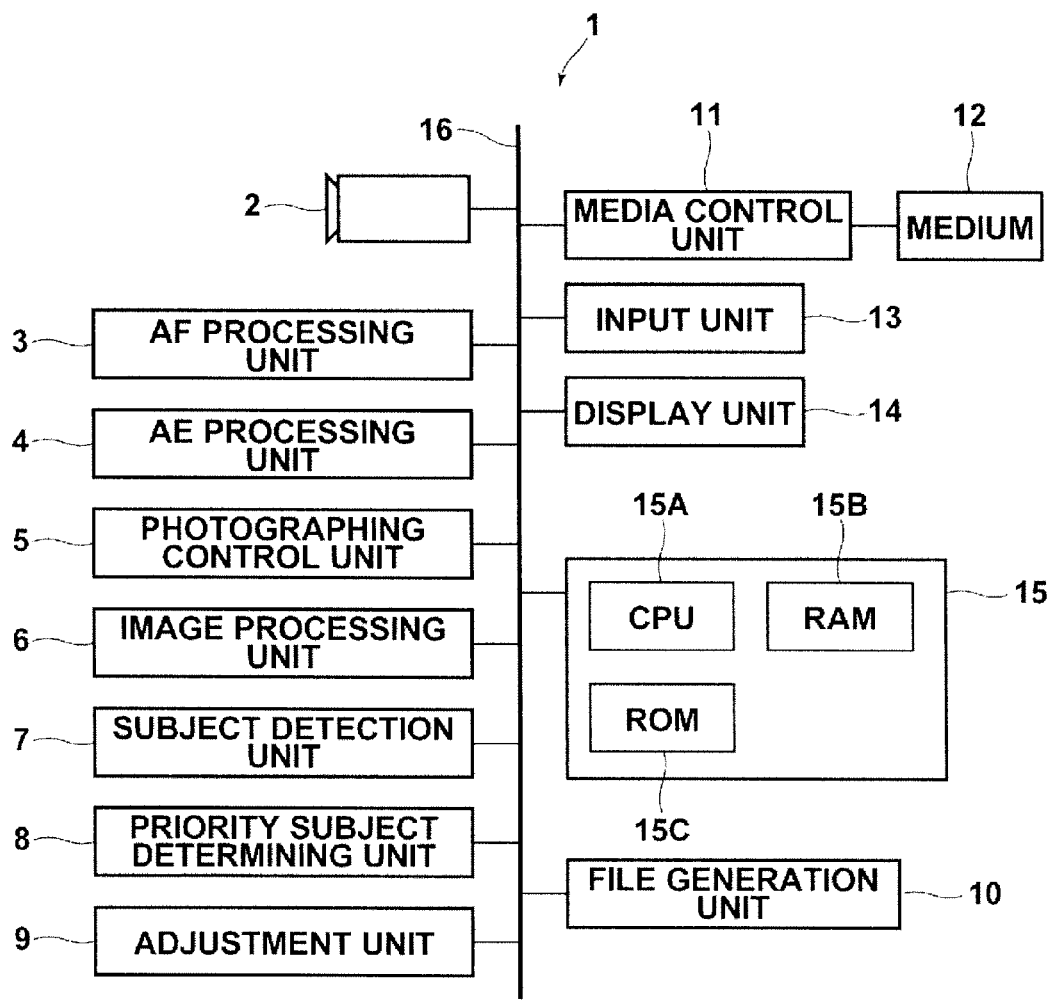
FIG. 1 is a schematic block diagram illustrating the internal configuration of a digital camera to which a photographing control device according to a first embodiment of the present invention is applied.

Hereinafter, embodiments of the present invention will be described with reference to the drawings. FIG. 1 is a schematic block diagram illustrating the internal configuration of a digital camera to which a photographing control device according to a first embodiment of the invention is applied. As shown in FIG. 1, a digital camera 1 according to the first embodiment includes a photographing unit 2, an AF processing unit 3, an AE processing unit 4, a photographing control unit 5, an image processing unit 6, a subject detection unit 7, a priority subject determining unit 8, an adjustment unit 9, a file generation unit 10, a media control unit 11, an input unit 13 including a release button and manual operation buttons, etc., to allow various inputs, a display unit 14, such as a LCD monitor, to carry out various displays and a control unit 15, which are connected via a bus 16.

Figure 2:
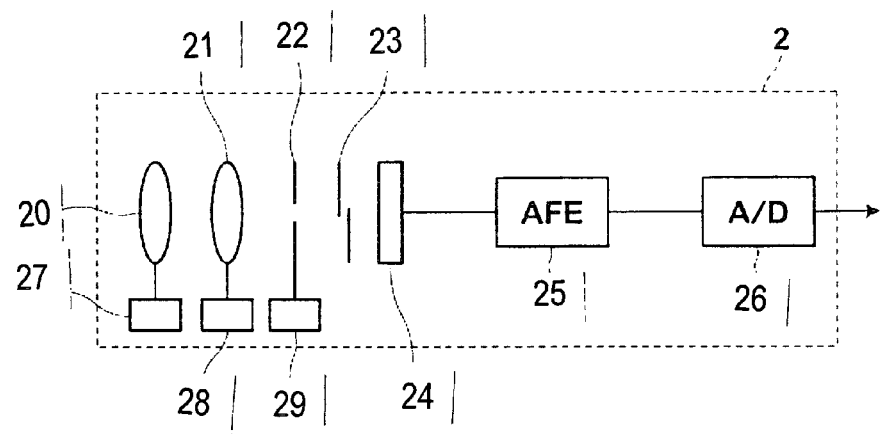
FIG. 2 is a diagram illustrating the configuration of a photographing unit.

FIG. 2 is a diagram illustrating the configuration of the photographing unit 2. As shown in FIG. 2, the photographing unit 2 includes a focusing lens 20, a zoom lens 21, an aperture diaphragm 22, a shutter 23, an image pickup device 24, an analog front end (AFE) 25 and an A/D converting unit 26. The photographing unit 2 further includes a focusing lens driving unit 27 for driving the focusing lens 20, a zoom lens driving unit 28 for driving the zoom lens 21, and an aperture diaphragm driving unit 29 for driving the aperture diaphragm 22.

The focusing lens 20 is used to focus on a subject, and can be moved along the optical axis direction by the focusing lens driving unit 27, which is foamed by a motor and a motor driver. The focusing lens driving unit 27 controls movement of the focusing lens 20 based on a focal position determined through AF processing carried out by the AF processing unit 3, which will be described later.

The zoom lens 21 is used to achieve zooming, and can be moved along the optical axis direction by the zoom lens driving unit 28, which is formed by a motor and a motor driver. The zoom lens driving unit 28 controls movement of the zoom lens 21 based on an instruction from the control unit 15, which is fed when a zoom lever (not shown) is operated.

The aperture diameter of the aperture diaphragm 22 is controlled by the aperture diaphragm driving unit 29 based on aperture value data, which is obtained through AE processing carried out by the AE processing unit 4.

The shutter 23 is a mechanical shutter, and is driven by a shutter driving unit (not shown) according to shutter speed data, which is obtained through the AE processing.

The image pickup device 24 includes a photoelectric surface, on which a large number of light-receiving elements are arranged two-dimensionally. A light image of the subject is focused on the photoelectric surface and is subjected to photoelectric conversion to provide an analog imaging signal. Further, a color filter formed by regularly arrayed R, G and B color filters are disposed on the front side of the image pickup device 24.

The AFE 25 processes the analog imaging signal fed from the image pickup device 24 to remove noise from the analog imaging signal and control gain of the analog imaging signal (this operation is hereinafter referred to as "analog processing").

The A/D converting unit 26 converts the analog imaging signal, which has been subjected to the analog processing by the AFE 25, into a digital imaging signal.

The AF processing unit 3 determines, based on preliminary images obtained through preliminary photographing carried out by the photographing unit 2 when a release button, which is included in the input unit 13, is half-pressed, a focused area in each preliminary image. Then, the AF processing unit 3 determines a focal position for the focusing lens 20, and outputs the information to the photographing unit 2.

The AE processing unit 4 determines, based on the preliminary images, the aperture value and the shutter speed as an exposure value, and outputs the information to the photographing unit 2.

The photographing control unit 5 instructs the photographing unit 2 to carry out actual photographing to acquire an actual image when the release button is fully pressed. It should be noted that, before the release button is operated, the photographing control unit 5 instructs the photographing unit 2 to acquire a live view image, which has fewer pixels than the actual image, at predetermined time intervals (for example, at intervals of 1/30 seconds) for checking an imaging range.

The image processing unit 6 applies, to the actual image, image quality correction processing, such as white balance adjustment, tone correction, sharpness correction and color correction.

Figure 3:
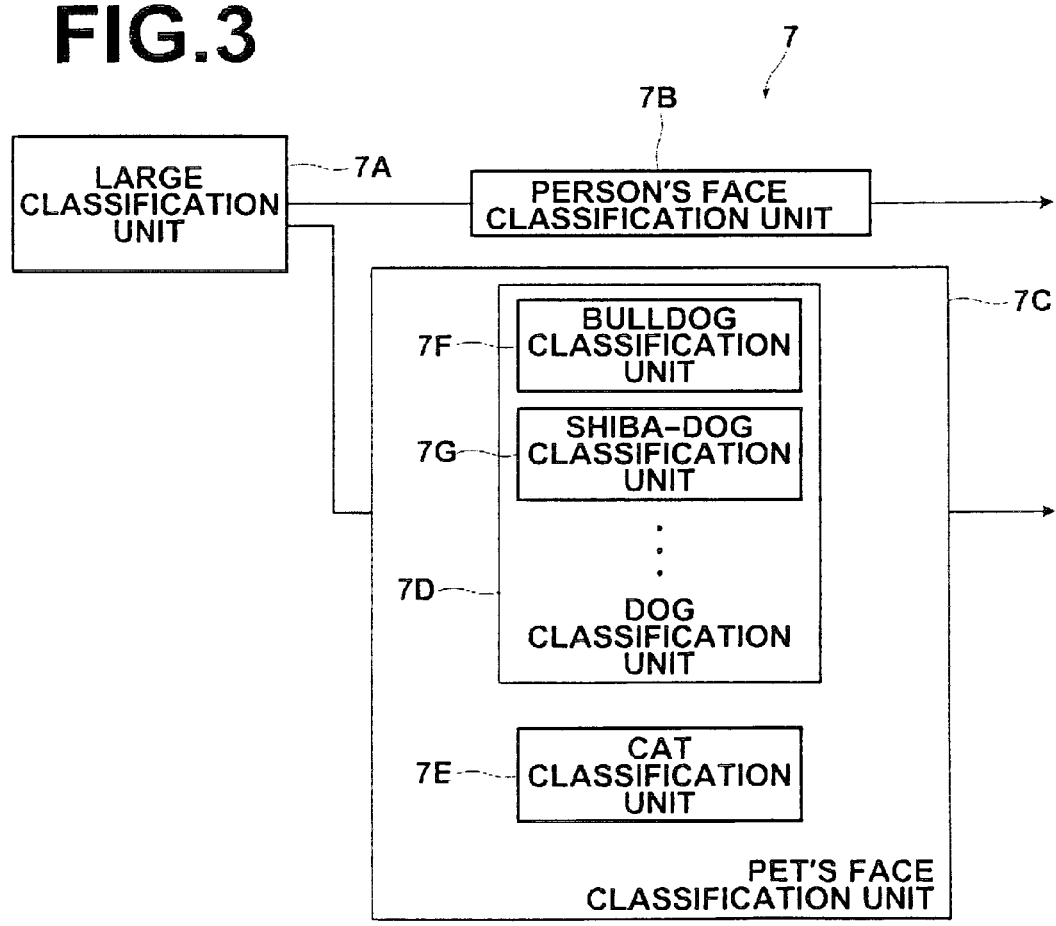
FIG. 3 is a block diagram illustrating the configuration of a subject detection unit.

The subject detection unit 7 detects two or more types of subjects from an image (including the actual image, the preliminary image or the live view image) obtained by the photographing unit 2. In this embodiment, the subjects are a person(s) and a pet(s) (for example, a dog). The subject detection unit 7 detects the faces of the person and the pet from the image by using a pattern matching technique, as disclosed in Patent Document 1, or a technique using face classifiers obtained through a machine learning process using a number of sample images of faces of persons and pets. Further, in this embodiment, classification units for classifying animal species, such as dog and cat, and breeds, such as bulldog and shiba-dog, are provided for detection of the pet. FIG. 3 is a block diagram illustrating the configuration of the subject detection unit. As shown in FIG. 3, the subject detection unit 7 includes a large classification unit 7A for largely classifying the subjects into two classes: person and pet. The subject detection unit 7 further includes a person's face classification unit 7B and a pet's face classification unit 7C. The pet's face classification unit 7C includes a dog classification unit 7D and a cat classification unit 7E. The dog classification unit 7D includes a bulldog classification unit 7F, a shiba-dog classification unit 7G, etc. With the thus formed subject detection unit 7, detection of the faces of persons and various pets as the subjects is achieved.

Figure 4:
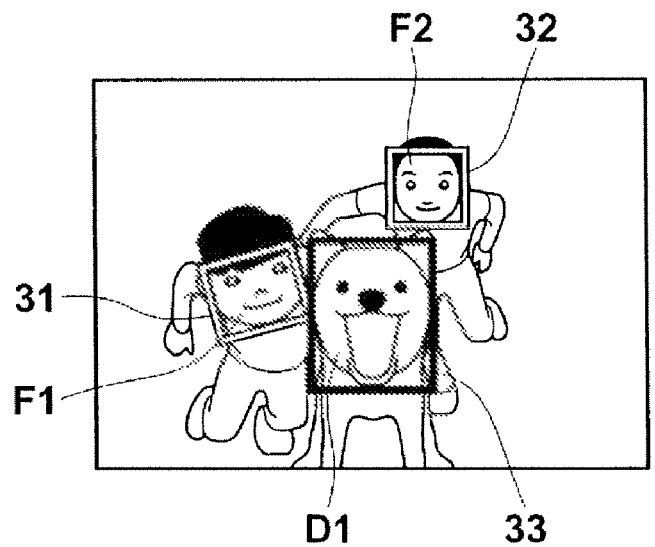
FIG. 4 is a diagram illustrating a result of subject detection.
Figure 5:
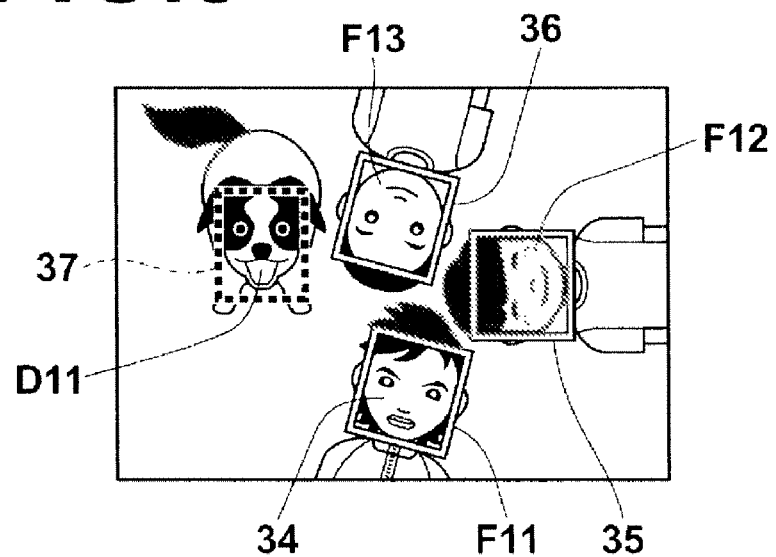
FIG. 5 is a diagram illustrating another result of subject detection.

In a case where two or more persons and pets are contained in the image, the subject detection unit 7 first largely classifies the subjects into person and pet, and then detects all the faces of the persons and the pets as the subjects. FIGS. 4 and 5 are diagrams each illustrating a result of subject detection from an image. As shown in FIG. 4, from the image containing two persons and one dog, subjects F1 and F2 corresponding to the faces of the two persons and a subject D1 corresponding to the face of the one dog are detected. As shown in FIG. 4, frames 31 to 33 are added to the detected subjects according to the size of each subject. As shown in FIG. 5, from the image containing three persons and one dog, subjects F11, F12 and F13 corresponding to the faces of the three persons and a subject D11 corresponding to the face of the one dog are detected. As shown in FIG. 5, frames 34 to 37 are added to the detected subjects according to the size of each subject.

Further, certain faces, such as the faces of the user and the user's child, and even the user's pet, may be registered in advance in a ROM 15C, which will be described later, to recognize the certain faces by carrying out face recognition after the subject detection. The face of a person or pet may be registered with being associated with the name of the person or pet.

The priority subject determining unit 8 determines a priority subject with the highest priority among the subjects detected by the subject detection unit 7. In this embodiment, the user sets priority conditions in advance, and the result of setting is stored in the ROM 15C, which will be described later. Then, the priority subject determining unit 8 determines the priority subject by referencing the conditions.

Figures 6, 7:
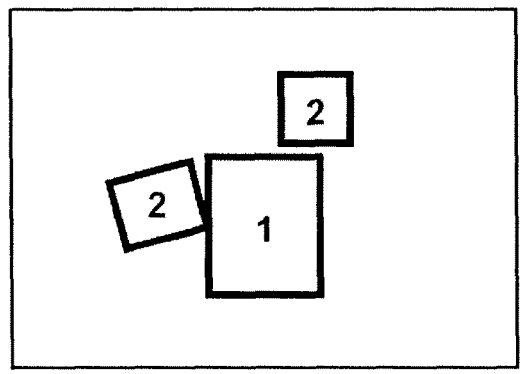
FIG. 6 is a diagram illustrating a setting screen used to set priority conditions.
FIG. 7 is a diagram illustrating a state of the image shown in FIG. 4 provided with labels.

FIG. 6 is a diagram illustrating a setting screen used to set the priority conditions. As shown in FIG. 6, the setting screen 40 includes check boxes 41 and 42 for selection of "person priority" or "pet priority". The setting screen 40 further includes check boxes 41A to 41D, which are used, when the person priority is selected, to select "center priority" to put priority on a face at the center, "larger size priority" to put priority on a face having the largest size, "child priority" to put priority on a face of a child, or "registered face priority" to put priority on a face which has been registered in advance. The setting screen 40 further includes check boxes 42A to 42C , which are used, when the pet priority is selected, to select "center priority" to put priority on a face at the center, "dog priority" to put priority on a dog, or "registered face priority" to put priority on a face which has been registered in advance. The user determines the priority subject using the setting screen 40. FIG. 5 shows a case where the pet priority is selected, and further the center priority is selected. Then, the subjects detected by the subject detection unit 7 are labeled to distinguish between the priority subject and subjects other than the priority subject. FIG. 7 is a diagram illustrating a state where, in the image shown in FIG. 4, the area in the frame 33 of the priority subject D1 (the face of the dog) is labeled with "1", and the areas in the frames 31 and 32 of the other subjects F1 and F2 (the faces of the persons) are labeled with "2".

In the image representing the result of detection, the frame of the priority subject may be displayed with a different color from the frame color of the other subjects. For example, in the case of the image shown in FIG. 4, when the animal priority is selected, and further the center priority is selected, the priority subject is the dog at the center. Therefore, the frame 33 of the dog may be displayed with a different color from the color of the frames 31 and 32 of the faces of the persons. Further, as shown in FIG. 5, when the animal priority is selected, the frame 37 of the face of the dog may be displayed in a dashed line.

Further, there are cases where the image contains only one subject or the image contains two or more subjects but does not contain a subject of the type with the priority set thereon. In these cases, the priority subject determining unit 8 determines the priority subject according to preset conditions. For example, in a case where only one subject is detected, the priority subject determining unit 8 determines the subject as the priority subject. In a case where two or more subjects are detected but there is no subject of the type with the priority set thereon, the priority subject determining unit 8 may determine, for example, the subject which is nearest to the center as the priority subject.

Figure 8:
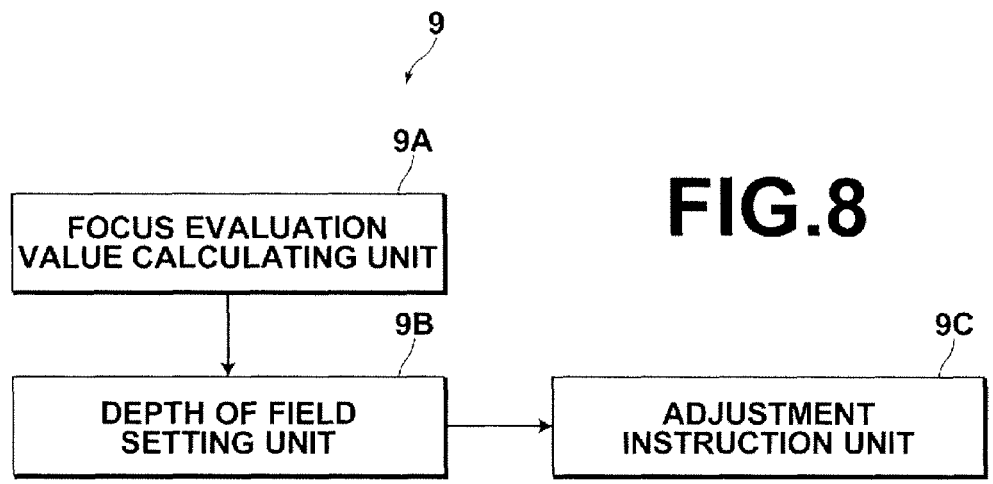
FIG. 8 is a schematic block diagram illustrating the configuration of a controlling unit in the first embodiment.

The adjustment unit 9 provides an instruction to each unit to carry out processing to improve image quality of the subjects detected by the subject detection unit 7 with putting priority on the priority subject. In this embodiment, the adjustment unit 9 instructs the AF processing unit 3, the AE processing unit 4 and the photographing control unit 5 to carry out actual photographing to obtain an image where the priority subject is focused and the subjects other than the priority subject are within the depth of field of the photographing unit 2. FIG. 8 is a schematic block diagram illustrating the configuration of the adjustment unit 9 in the first embodiment. As shown in FIG. 8, the adjustment unit 9 includes a focus evaluation value calculating unit 9A, a depth of field setting unit 9B and an adjustment instruction unit 9C. Now, adjustment instruction by the adjustment unit 9 is described.

Per instructions fed from the adjustment instruction unit 9C of the adjustment unit 9, the AF processing unit 3 and the photographing control unit 5 carry out a plurality of photographing operations to obtain a plurality of images with shifting the focal position of the focusing lens 20. The images obtained by these photographing operations have a fewer number of pixels than that of the actual image and are used for adjustment, and are hereinafter referred to as "adjustment images". Then, the focus evaluation value calculating unit 9A of the adjustment unit 9 calculates a focus evaluation value for each subject area (i.e., a labeled area) detected from each of the obtained adjustment images. For the focus evaluation value, a high-frequency component or contrast of the subject area may be used. Then, the focus evaluation value calculating unit 9A compares the focus evaluation values of the corresponding subject areas between the plurality of adjustment images, and determines the focal position of one of the adjustment images which has the highest focus evaluation value as the focal position of the subject. Then, the depth of field setting unit 9B determines the depth of field with using, as the reference, the focal position of the priority subject, among the focal positions with the highest focus evaluation values for the individual subject areas.

Figure 9:
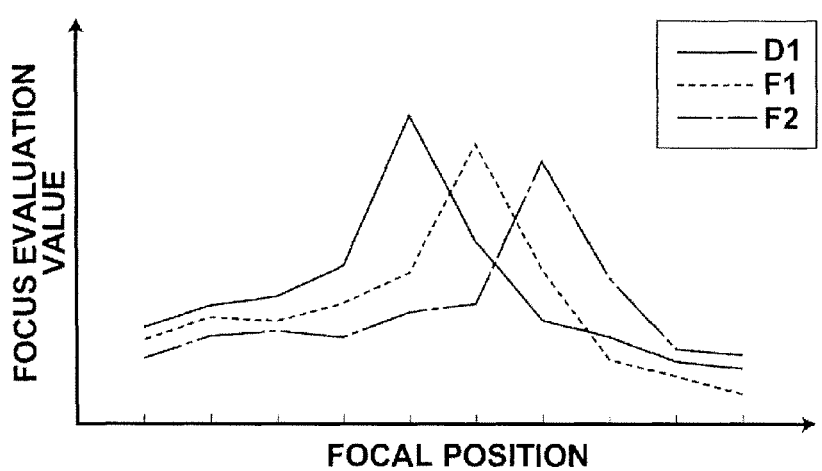
FIG. 9 is a diagram illustrating a relationship between a focal position and a focus evaluation value for each subject area.

FIG. 9 is a diagram illustrating a relationship between the focal position and the focus evaluation value for each subject area. The relationship between the focal position and the focus evaluation value shown in FIG. 9 is that of ten adjustment images obtained by photographing the three subjects D1, F1 and F2 shown in FIG. 4 with ten different focal positions. It can be seen from FIG. 9 that the focal position with the highest focus evaluation value for the subject D1, that for the subject F1 and that for the subject F2 differ from each other, namely, that for the subject D1 is the nearest, that for the subject F2 is the farthest, and that for the subject F1 is between them. Therefore, the AF processing unit 3 determines the focal position so that the priority subject D1 is focused, and the depth of field setting unit 9B determines the depth of field with referencing the focal position with the highest focus evaluation value of each of the other subjects F1 and F2, with the focal position of the priority subject D1 being the reference. Then, the adjustment instruction unit 9C inputs the information of the depth of field to the AE processing unit 4. The AE processing unit 4 determines the aperture value for actual photographing to achieve the inputted depth of field.

It should be noted that, during the plurality of photographing operations to obtain the plurality of adjustment images, the aperture may be changed instead of shifting the focal position. In this case, first, the focal position is determined so that the priority subject is focused, and then, the photographing operations are carried out with changing the aperture value to obtain the adjustment images. Then, a total sum of the focus evaluation values of the subject areas is calculated for each of the adjustment images, and the aperture value with the highest total sum may be determined as the aperture value for actual photographing.

In a case where the image contains only one subject, or the image contains two or more subjects but does not contain a subject of the type with the priority set thereon, the adjustment unit 9 provides instructions to the AF processing unit 3, the AE processing unit 4 and the photographing control unit 5 so that only the priority subject, which is determined according to preset conditions as described above, is focused.

The file generation unit 10 compresses the image data of the actual image according to a certain compression format, such as JPEG, and generates an image file G0. A header, which stores associated information, such as photographing time and date, is added to the image file G0 based on the Exif format, for example.

The media control unit 11 accesses a medium 12, such as a memory card, and controls writing and reading of the image file G0.

The control unit 15 includes a CPU 15A, a RAM 15B for providing a work area for various operations carried out by the apparatus 1, and the ROM 15C which stores operation programs, various constants, etc., for the apparatus 1. The control unit 15 controls the units of the apparatus 1.

Figure 10:
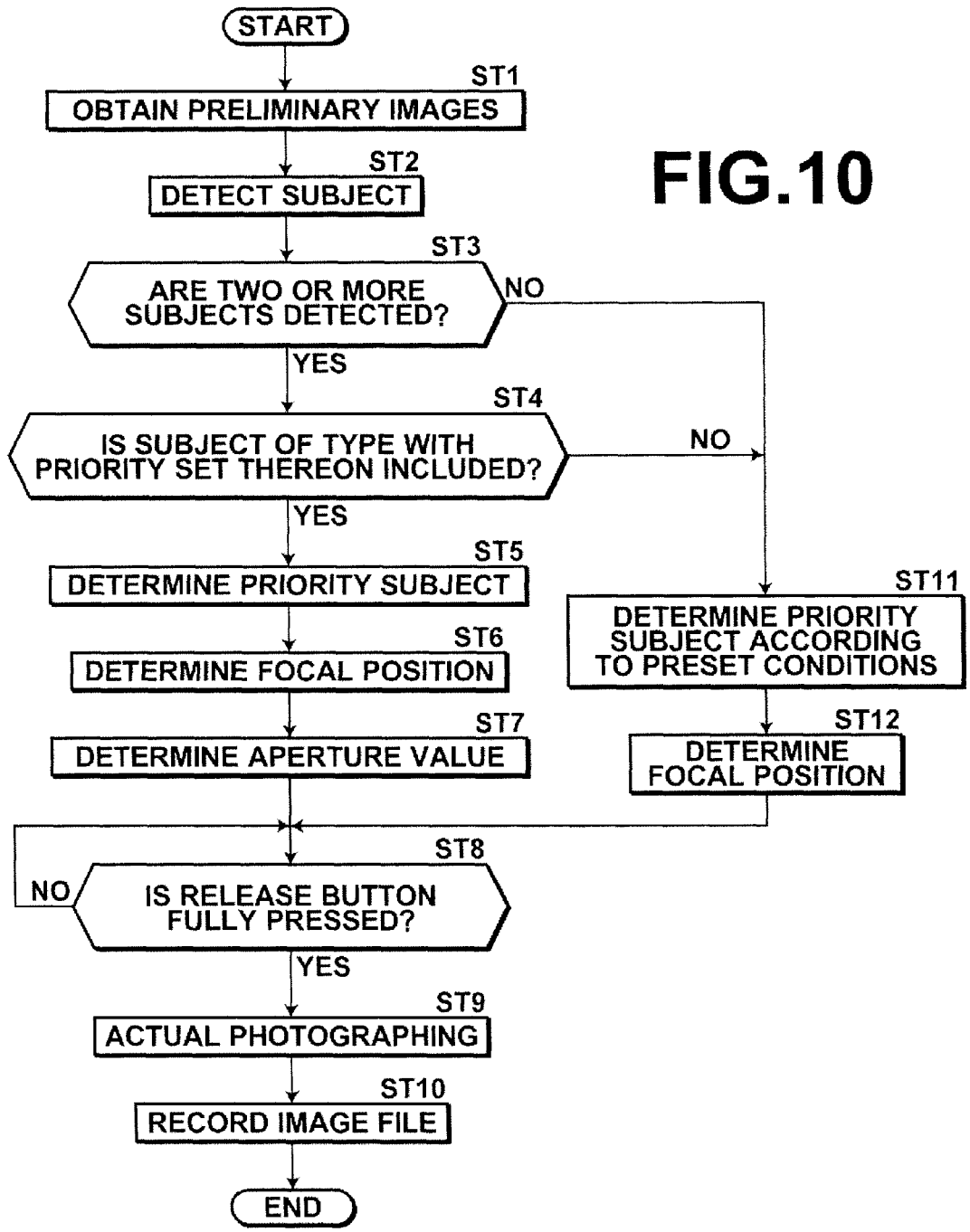
FIG. 10 is a flow chart illustrating a process carried out in the first embodiment.

Next, a process carried out in the first embodiment is described. FIG. 10 is a flow chart illustrating the process carried out in the first embodiment. In this example, the subject detection is carried out after an instruction to photograph is fed when the release button is half-pressed. However, the subject detection may be carried out during photographing of the live view image before the instruction to photograph is fed. As the instruction to photograph is fed, the control unit 15 starts the process, and the photographing unit 2 carries out preliminary photographing to obtain the preliminary images (step ST1). Then, the subject detection unit 7 detects all subjects from the preliminary images (step ST2).

FIG. 11 is a flow chart illustrating a subject detection process. First, the large classification unit 7A of the subject detection unit 7 largely classifies the subjects into two classes, i.e., person and pet (step ST21). Then, the person's face classification unit 7B classifies the face of a person (step ST22). Further, the dog classification unit 7F, etc., of the pet's face classification unit 7C carryout detailed classification of the face of a pet (step ST23). Then, the subject detection process ends.

Subsequently, the priority subject determining unit 8 determines whether or not two or more subjects are detected (step ST3). If the determination in step ST3 is affirmative, further determination is made as to whether or not a subject of the type with the priority set thereon is included in the detected subjects (step ST4).

If the determination in step ST4 is affirmative, the priority subject determining unit 8 determines the priority subject (step ST5). Then, per instructions from the adjustment unit 9, the AF processing unit 3 and the photographing control unit 5 determine the focal position so that the priority subject is focused (step ST6), and the AE processing unit 4 determines the aperture value so that the subjects other than the priority subject are within the depth of field (step ST7).

Subsequently, the control unit 15 starts monitoring to determine whether or not the release button is fully pressed, i.e., an instruction of actual photographing is made (step ST8). If the determination in step ST8 is affirmative, actual photographing is carried out (step ST9). Then, the image processing unit 6 applies image processing to the actual image obtained through the actual photographing, and the file generation unit 10 generates the image file G0 of the image subjected to the image processing. Further, the media control unit 11 records the image file G0 on the medium 12 (step ST10), and the process ends.

If the determination in step ST3 or step ST4 is negative, the priority subject determining unit 8 determines the priority subject according to preset conditions (step ST11). Then, per instructions from the adjustment unit 9, the AF processing unit 3 and the photographing control unit 5 determine the focal position so that only the priority subject is focused (step ST12), and the process proceeds to step ST8.

As described above, in the first embodiment, when two or more types of subjects are detected from an image, one priority subject is determined among the two or more types of subject, and the photographing operation is controlled so that the priority subject is focused and the subjects other than the priority subject are within the depth of field. Thus, an image in which the priority subject is best focused and the other subjects are generally focused can be obtained.

Next, a second embodiment of the invention is described. A digital camera to which a photographing control device according to the second embodiment is applied have the same configuration as the digital camera to which the photographing control device according to the first embodiment is applied, and only the processes to be carried out are different. Therefore, the configuration is not described in detail. In the digital camera to which the photographing control device according to the second embodiment is applied, a process to provide a desired lightness of the priority subject and to adjust the dynamic range to prevent white saturation and black saturation of the other subjects is additionally carried out.

FIG. 12 is a schematic block diagram illustrating the configuration of a adjustment unit 9' in the second embodiment. As shown in FIG. 12, the difference of the second embodiment from the first embodiment lies in that the adjustment unit 9' includes an exposure evaluation value calculating unit 9D in addition to the focus evaluation value calculating unit 9A, the depth of field setting unit 9B and the adjustment instruction unit 9C provided in the adjustment unit 9 according to the first embodiment. The exposure evaluation value calculating unit 9D calculates, for the adjustment image which has the highest focus evaluation value for the priority subject among the plurality of adjustment images, the lightness of the priority subject as an exposure evaluation value. Specifically, the exposure evaluation value calculating unit 9D calculates an average of pixel values of pixels in the area of the priority subject in the adjustment image as the lightness of the priority subject, i.e., as the exposure evaluation value. Then, the adjustment instruction unit 9C inputs the information of the exposure evaluation value to the AE processing unit 4 and the image processing unit 6.

Based on the information of the exposure evaluation value fed from the adjustment unit 9', the AE processing unit 4 determines the shutter speed to achieve a desired lightness of the priority subject.

In the second embodiment, the image processing unit 6 estimates the lightness of the actual image that will be obtained with the determined shutter speed, and determines whether or not white saturation or black saturation will occur in the subjects other than the priority subject. If it is determined that the white saturation or black saturation will occur, the image processing unit 6 determines a tone curve, which is applied to the actual image for tone correction, so that the dynamic range of the actual image is compressed.

Figure 13:
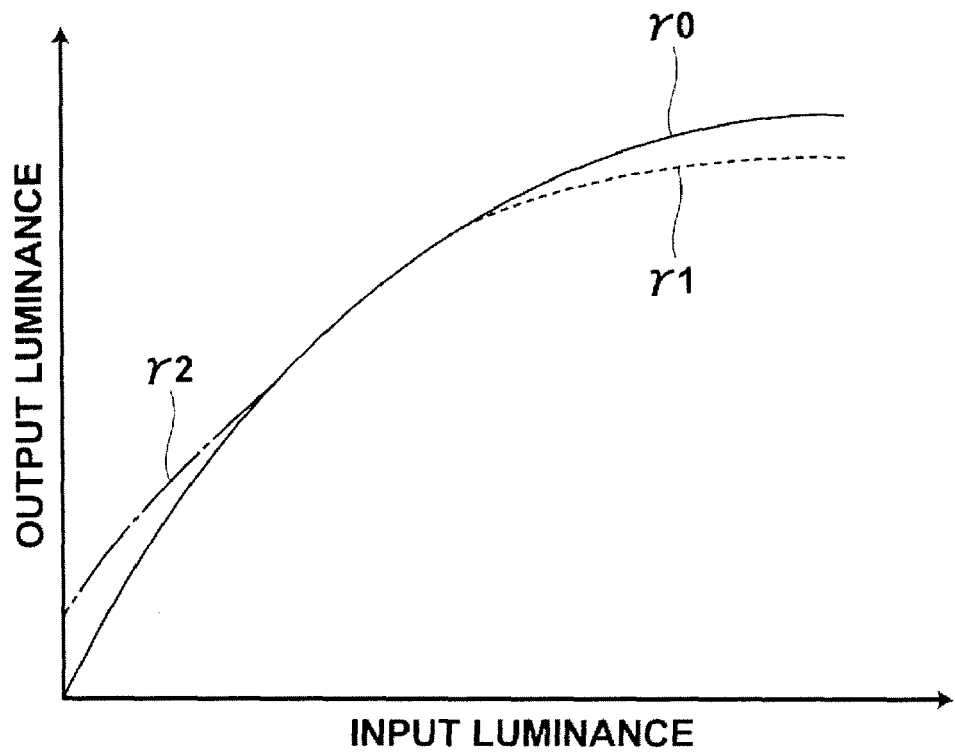
FIG. 13 is a diagram for explaining an operation to determine a tone curve.

FIG. 13 is a diagram for explaining an operation to determine the tone curve. In the second embodiment, a basic tone curve $\gamma 0$ is stored in the ROM 15C in advance. If white saturation occurs in the other subjects, the image processing unit 6 generates a tone curve $\gamma 1$ by reducing the contrast at the higher luminance range of the tone curve $\gamma 0$. In contrast, if black saturation occurs in the other subjects, the image processing unit 6 generates a tone curve $\gamma 2$ by reducing the contrast at the lower luminance range of the tone curve $\gamma 0$. The thus generated tone curve $\gamma 1$ or $\gamma 2$ compresses the dynamic range of the image. In this manner, tone correction of the actual image to prevent occurrence of white saturation and black saturation is achieved.

In the second embodiment, in cases where the image contains only one subject or the image contains two or more subjects but does not contain a subject of the type with the priority set thereon, the adjustment unit 9 instructs the AF processing unit 3, the AE processing unit 4, the photographing control unit 5 and the image processing unit 6 so that only the priority subject, which is determined according to preset conditions as described above, is focused and the priority subject has a desired lightness.

Next, a process carried out in the second embodiment is described. FIG. 14 is a flowchart illustrating the process carried out in the second embodiment. In this example, the subject detection is carried out after an instruction to photograph is fed when the release button is half-pressed. However, the subject detection may be carried out during photographing of the live view image before the instruction to photograph is fed. Operations in steps ST31 to ST37 of the flow chart shown in FIG. 14 are the same as the operations in steps ST1 to ST7 in the first embodiment, and therefore, only operations in step ST38 and the following steps are described.

After step ST37, per instructions from the adjustment unit 9, the AE processing unit 4 determines the shutter speed to achieve a desired lightness of the priority subject (step ST38), and the image processing unit 6 determines the tone curve to prevent white saturation and black saturation in the other subjects (step ST39).

Then, the control unit 15 starts monitoring to determine whether or not the release button is fully pressed, i.e., an instruction of actual photographing is made (step ST40). If the determination in step ST40 is affirmative, actual photographing is carried out (step ST41). Then, the image processing unit 6 applies image processing to the actual image obtained through the actual photographing, and the file generation unit 10 generates the image file G0 of the image subjected to the image processing. Further, the media control unit 11 records the image file G0 on the medium 12 (step ST42), and the process ends.

If the determination in step ST33 or ST34 is negative, the priority subject determining unit 8 determines the priority subject according to preset conditions (step ST43). Then, per instructions from the adjustment unit 9, the AF processing unit 3 and the photographing control unit 5 determine the focal position so that only the priority subject is focused (step ST44). Then, per instructions from the adjustment unit 9, the AE processing unit 4 determines the shutter speed to achieve a desired lightness of the priority subject (step ST45), and the process proceeds to step ST40.

As described above, in the second embodiment, a predetermined lightness of the priority subject is achieved, and the dynamic range of the image is adjusted so that the subjects other than the priority subject are within the dynamic range of the image. Thus, an image in which the priority subject has a predetermined lightness and no white saturation and black saturation occur in the other subjects can be obtained.

It should be noted that, although the above-described two processes, i.e., the process to make the priority subject be focused and the subjects other than the priority subject be within the depth of field and the process to adjust the dynamic range of the image to make the priority subject have a predetermined lightness and the subjects other than the priority subject be within the dynamic range of the image are carried out in the first and second embodiments, only one of these processes may be carried out. Besides these two processes, a process to provide a more preferable color of the priority subject than the colors of the other subjects, and/or a process to enhance the sharpness of the priority subject compared to the other subjects may be carried out.

Further, although the face detection of the pet is carried out for two or more types of animals, such as dog and cat, in the first and second embodiments, the face detection of the pet may be carried out for only one type of animal, such as dog or cat, that is determined in advance.

The digital camera 11 according to the embodiments of the invention has been described. The present invention may also be implemented as a program for causing a computer to function as the AF processing unit 3, the AE processing unit 4, the photographing control unit 5, the image processing unit 6, the subject detection unit 7, the priority subject determining unit 8 and the adjustment unit 9 and to carry out the processes shown in FIGS. 10, 11 and 14.

The present invention may also be implemented as a computer-readable recording medium that contains such a program.

What is claimed is:

1. A photographing control device, comprising:
photographing means for obtaining an image, the photographing means comprising an optical system provided with an aperture and focus adjusting mechanism;
subject detecting means for detecting two or more types of subjects from the image;
priority subject determining means for determining, when the two or more types of subjects are detected from the image, one priority subject among the two or more types of subjects; and
adjusting means for adjusting the aperture and the optical system so that the priority subject is focused and a subject other than the priority subject is within a depth of field of the photographing means, wherein the detected subjects are labeled to distinguish between the priority subject and the subject other than the priority subject.

2. The photographing control device as claimed in claim 1, further comprising dynamic range adjusting means for adjusting a dynamic range of the image so that the priority subject has a predetermined lightness and the subject other than the priority subject is within the dynamic range of the image.

3. The photographing control device as claimed in claim 1, wherein the subject detecting means detects a human face and at least one type of animal face as the two or more types of subjects.

4. A photographing apparatus comprising the photographing control device as claimed in claim 1.

5. The photographing control device as claimed in claim 1, wherein the adjusting means adjusts the aperture and the optical system by considering the priority subject and the subject other than the priority subject.

6. The photographing control device as claimed in claim 1, further comprising dynamic range adjusting means for adjusting a dynamic range of the image such that the subject other than the priority subject is within the dynamic range of the image.

7. The photographing control device as claimed in claim 1, further comprising:
display means for showing a setting screen to set priority conditions, and to determine the priority subject by receiving a user's indication using the setting screen.

8. The photographing control device as claimed in claim 1, wherein the subject other than the priority subject comprises a plurality of subjects, each of said plurality of subjects being labeled with a same label and different from a label of the priority subject.

9. A photographing control method, comprising:
obtaining an image using photographing means comprising an optical system provided with an aperture and a focus adjusting mechanism;
detecting two or more types of subjects from the image;
determining, when the two or more types of subjects are detected from the image, one priority subject among the two or more types of subjects;
adjusting the aperture and the optical system so that the priority subject is focused and a subject other than the priority subject is within a depth of field of the photographing means; and
labeling the detected subjects to distinguish between the priority subject and the subject other than the priority subject.

10. The photographing control method as claimed in claim 9, further comprising adjusting a dynamic range of the image so that the priority subject has a predetermined lightness and the subject other than the priority subject is within the dynamic range of the image.

11. The photographing control method as claimed in claim 9, wherein the detecting comprises detecting a human face and at least one type of animal face as the two or more types of subjects.

12. The photographing control method as claimed in claim 9, wherein said adjusting includes adjusting the aperture and the optical system by considering the priority subject and the subject other than the priority subject.

13. The photographing control method as claimed in claim 9, further comprising adjusting a dynamic range of the image such that the subject other than the priority subject is within the dynamic range of the image.

14. The photographing control method at claimed in claim 9, further comprising:
showing a setting screen to set priority conditions, and determining the priority subject by receiving a user's indication using the setting screen.

15. The photographing control method as claimed in claim 9, wherein the subject other than the priority subject comprises a plurality of subjects, and
wherein said labeling the detected subjects comprises setting priority conditions on a setting screen to label the plurality of subjects with a same label and different from a label of the priority subject.

16. A non-transitory computer readable recording medium comprising a program for causing a computer to carry out a photographing control method, said method comprising:
obtaining an image using photographing means comprising an optical system provided with an aperture and focus adjusting mechanism;
detecting two or more types of subjects from the image;
determining, when the two or more types of subjects are detected from the image, one priority subject among the two or more types of subjects;
adjusting the aperture and the optical system so that the priority subject is focused and a subject other than the priority subject is within a depth of field of the photographing means; and
labeling the detected subjects to distinguish between the priority subject and the subject other than the priority subject.

17. The non-transitory computer readable recording medium as claimed in claim 16, wherein said adjusting includes adjusting the aperture and the optical system by considering the priority subject and the subject other than the priority subject.

18. The non-transitory computer readable recording medium as claimed in claim 16, wherein said method further comprises adjusting a dynamic range of the image so that the priority subject has a predetermined lightness and the subject other than the priority subject is within the dynamic range of the image.

19. The non-transitory computer readable recording medium as claimed in claim 16, wherein said method further comprises adjusting a dynamic range of the image such that the subject other than the priority subject is within the dynamic range of the image.

20. The non-transitory computer readable recording medium as claimed in claim 16, wherein said method further comprises:
showing a setting screen to set priority conditions, and determining the priority subject by receiving a user's indication using the setting screen.

* * * * *